(12) United States Patent
Suryanarayana et al.

(10) Patent No.: US 11,928,028 B2
(45) Date of Patent: Mar. 12, 2024

(54) EXCEPTION HANDLER FOR DYNAMIC REMEDIATION OF FATAL ERRORS

(71) Applicant: Dell Products, L.P., Round Rock, TX (US)

(72) Inventors: Shekar Babu Suryanarayana, Bangalore (IN); Vivek Viswanathan Iyer, Saint Johns, FL (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/812,491

(22) Filed: Jul. 14, 2022

(65) Prior Publication Data

US 2024/0020198 A1    Jan. 18, 2024

(51) Int. Cl.
*G06F 11/00* (2006.01)
*G06F 11/07* (2006.01)
*G06F 11/14* (2006.01)

(52) U.S. Cl.
CPC ...... *G06F 11/1417* (2013.01); *G06F 11/0778* (2013.01)

(58) Field of Classification Search
CPC ............. G06F 11/1417; G06F 11/0778; G06F 11/079; G06F 11/0793; G06F 11/2257; G06F 11/2284
See application file for complete search history.

(56) References Cited

U.S. PATENT DOCUMENTS

| | | | | |
|---|---|---|---|---|
| 9,529,602 B1* | 12/2016 | Swierk | ................ | G06F 9/45558 |
| 11,429,490 B1* | 8/2022 | Sayyed | ................ | G06F 9/4416 |
| 2015/0074457 A1* | 3/2015 | Liu | ...................... | G06F 11/0793 |
| | | | | 714/15 |
| 2016/0239314 A1* | 8/2016 | Suryanarayana | ..... | H04L 5/0044 |
| 2016/0371163 A1* | 12/2016 | Swierk | ................ | G06F 11/2284 |
| 2016/0378602 A1* | 12/2016 | Herzi | .................. | G06F 11/1417 |
| | | | | 714/2 |
| 2020/0285534 A1* | 9/2020 | Chaiken | ............. | G06F 11/0745 |
| 2020/0363974 A1* | 11/2020 | Wei | ...................... | G06F 3/0604 |

\* cited by examiner

*Primary Examiner* — Joseph D Manoskey
(74) *Attorney, Agent, or Firm* — Fogarty LLP

(57) ABSTRACT

An exception handler for dynamic remediation of fatal errors is described. In an illustrative, non-limiting embodiment, an Information Handling System (IHS) may include a Central Processing Unit (CPU) and a memory coupled to the CPU, the memory having program instructions stored thereon that, upon execution, cause the IHS to: in response to an error, call a CPU Exception Service Routine (ESR); and at least one of: re-initialize a pre-boot network stack and transmit error data to a remote service using the pre-boot network stack; or re-initialize a pre-boot storage stack and store the error data using the pre-boot storage stack.

20 Claims, 8 Drawing Sheets

US 11,928,028 B2

EXCEPTION HANDLER FOR DYNAMIC REMEDIATION OF FATAL ERRORS

FIELD

This disclosure relates generally to Information Handling Systems (IHSs), and, more specifically, to systems and methods for providing an exception handler for dynamic remediation of fatal errors.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

An exception handler for dynamic remediation of fatal errors is described. In an illustrative, non-limiting embodiment, an Information Handling System (IHS) may include a Central Processing Unit (CPU) and a memory coupled to the CPU, the memory having program instructions stored thereon that, upon execution, cause the IHS to: in response to an error, call a CPU Exception Service Routine (ESR); and at least one of: re-initialize a pre-boot network stack and transmit error data to a remote service using the pre-boot network stack; or re-initialize a pre-boot storage stack and store the error data using the pre-boot storage stack.

In some cases, the error may include a Blue Screen of Death (BSoD) or stop error. Additionally, or alternatively, the error may include a Power-On Self-Test (POST) error. For example, the error may include at least one of: page fault, double fault, triple fault, abort, overflow, invalid opcode, general protection fault, or machine check.

The program instructions, upon execution, may cause the IHS to use the ESR to load an error remediation module. Additionally, or alternatively, the program instructions, upon execution, may cause the IHS to implement a runtime memory map of pre-boot drivers. Additionally, or alternatively, the program instructions, upon execution, may cause the IHS to continue an IHS boot from a point of failure corresponding to the error.

The program instructions, upon execution, may cause the IHS to allocate memory space for the ESR in a pre-Extensible Firmware Interface (EFI) initialization (PEI) phase. Additionally, or alternatively, the program instructions, upon execution, may cause the IHS to remap an ESR table (ESRT) into a runtime memory space as an Interrupt Service Routine Table (ISRT). The remapped ESRT may be configured to handle an Operating System (OS) runtime failover exception.

The program instructions, upon execution, may cause the IHS to receive an auto-healing module from the remote service based, at least in part, upon the error data. The auto-healing module may be configured to allow the IHS to continue a current boot without any reboot or shutdown. The auto-healing module may be selected among other auto-healing modules classified as belonging to at least one of: a compute or memory domain, a power or thermal domain, or a peripheral or firmware domain. Additionally, or alternatively, the auto-healing module may be selected based upon another error in another IHS.

In another illustrative, non-limiting embodiment, a method may include: in response to a fatal error, calling a CPU ESR; and re-initializing a pre-boot network stack and transmitting error data to a remote service using the pre-boot network stack. For example, the method may include using the ESR to load an error remediation module. The method may also include booting the IHS from a point of failure corresponding to the error.

In yet another illustrative, non-limiting embodiment, a memory storage device may have program instructions stored thereon that, upon execution by an IHS, cause the IHS to: in response to a fatal error, call a CPU ESR; and re-initialize a pre-boot storage stack and store error data in the IHS using the pre-boot storage stack. The program instructions, upon execution, may also cause the IHS to use the ESR to load an error remediation module. The error remediation module may be configured to allow the IHS to continue a current boot without any reboot or shutdown.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
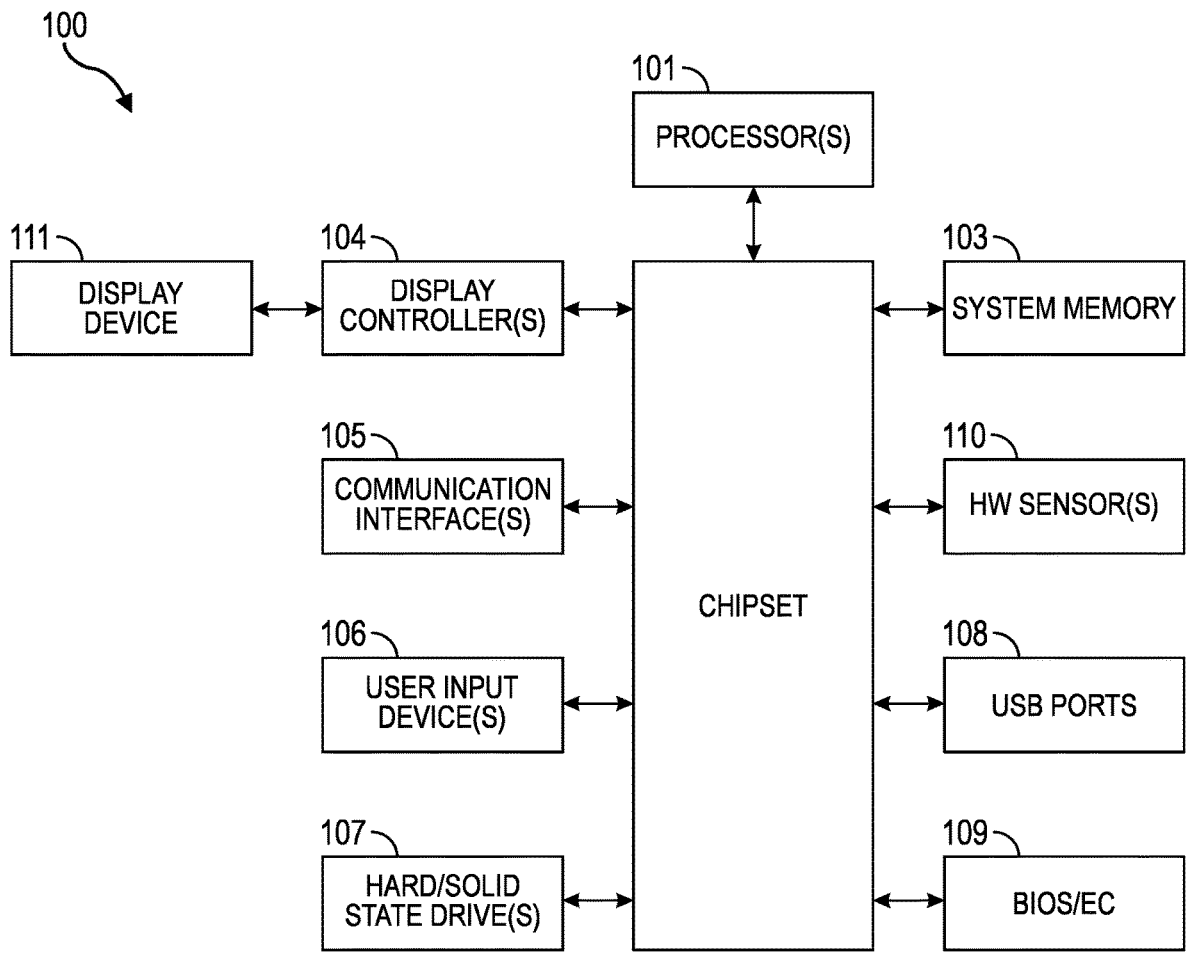
FIG. 1 is a diagram of examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

In the context of IHSs, the term "Power-On Self-Test" (POST) refers to a set of procedures that an IHS executes each time the IHS is turned on. It ensures that all IHS hardware is working properly before trying to load an Operating System (OS). If an IHS does not pass POST, the IHS does not boot.

Conversely, a "Blue Screen of Death" (BSoD), also known as a "stop error" or "blue screen error," is an error screen that certain Operating Systems (OSs) (e.g., MICROSOFT WINDOWS) display in the event of a fatal error, after having booted. Generally, a BSoD indicates an IHS crash in which the OS has reached a critical condition where it can no longer operate safely (e.g., due to an unexpected termination of a crucial process). These types of fatal errors can often be attributed to problems with CPU, memory and storage domains, firmware data store, Driver eXecution Environment (DXE) load modules, Pre-Extensible Firmware Interface (EFI) Initialization (PEI) load modules, OS/virtual machine (VM), power and thermal systems, etc.

Once an IHS runs into a POST failure, there is no way to continue booting the IHS. Similarly, once an IHS runs into a BSoD failure, there is no way to maintain the OS in runtime. The execution of failure diagnostics and/or the search and deployment of auto-healing or mitigation modules (e.g., retrieved from a remote service) is not currently available. Moreover, there are presently no mechanisms for importing or exporting telemetry logs by CPU exception handlers, to collect Root Cause Analysis (RCA) data about the failure, and/or to learn an IHS's behavior against corruptions of modules, such as, memory, Serial Peripheral Interface (SPI) flash, non-volatile RAM (NVRAM), relocation map, complementary metal-oxide semiconductor (CMOS), etc.

To address these, and other concerns, systems and methods described herein provide an exception handler for dynamic remediation of fatal errors, in the field, and/or to provide a failover OS boot and critical data. In some embodiments, these systems and methods may provide a CPU Exception Service Routine (ESR) configured to dynamically reinitialize a pre-boot network stack and/or a storage stack to locate and load context specific remediation module(s) to ensure boot continuity of an IHS.

These systems and methods may also be configured to dynamically learn failure behaviors and to build defensible self-healing protocols to provide improved user experience. Techniques are described for exporting RCA and critical data to the cloud, and to import auto-heal modules from the cloud based on failure learning, for example, from IHSs in other lines of business (LOBs). Moreover, a remediation protocol as described herein may implement a runtime memory map of pre-boot drivers to facilitate the booting of an IHS from its point of failure without rebooting, resetting, or shutting the IHS down.

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BT, cellular or mobile networks (e.g., code-division multiple access or "CDMA," time-division multiple access or "TDMA," Long-Term Evolution or "LTE," etc.), satellite networks, or the like. In some cases, interface(s) 105 may be used to communicate with peripheral devices. Moreover, interface(s) 105 may be coupled to chipset 102 via a PCIe bus.

Chipset 102 may be coupled to display controller(s) 104, which may include one or more or graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable a collaboration mode for a touchpad coupled or integrated into IHS 100.

Chipset 102 may also provide access to one or more hard disk and/or solid-state drives 107. In certain embodiments, chipset 102 may also provide access to one or more optical drives or other removable-media drives. In certain embodiments, chipset 102 may also provide access to one or more USB ports 108, to which one or more peripheral devices may be coupled (e.g., wiredly or wirelessly though a dongle).

Chipset 102 may further provide access to one or more user input devices 106, for example, using a super I/O controller or the like. Examples of user input devices 106 include, but are not limited to, a keyboard, mouse, touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, and may include, but are not limited to: electric, magnetic, radio, optical, infrared, thermal, force, pressure, acoustic, ultrasonic, proximity, position, GPS, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. BIOS 109 provides an abstraction layer that allows the OS to interface with certain hardware components that are utilized by IHS 100. Via the hardware abstraction layer provided by BIOS 109, software stored in system memory 103 and executed by processor 101 can interface with certain I/O devices that are coupled to IHS 100.

The Unified Extensible Firmware Interface (UEFI) Specification describes an interface between the OS and the system firmware that has been designed as a successor to BIOS. As a result, many modern IHSs utilize UEFI in addition to, or instead of, BIOS 109. The UEFI specification describes an interface between the OS and the IHS's firmware, and it provides protocols usable by EFI drivers to communicate with each other, allocate memory, create events, set the clock, etc. As used herein, BIOS 109 is intended to also encompass a UEFI component.

The UEFI Specification defines execution phases during a boot sequence of IHS 100, including: security (SEC), pre-efi initialization (PEI), driver execution environment (DXE), boot device selection (BDS), run time (RT) services, and After Life (AL).

The SEC phase is the first phase and is it responsible for: handling all IHS restart events, creating a temporary memory store, cerving as the root of trust in IHS 100, and passing handoff information to the PEI phase. PEI includes the minimum amount of program code needed to perform basic platform initialization and is executed from non-volatile memory. When the PEI phase has completed its initialization, including the initialization of main memory, control passes to the DXE phase, which performs higher-level IHS initialization and diagnostic operations. The BDS phase is responsible for: initializing console devices, loading device drivers, and attempting to load and execute boot selections. The RT phase allows access to persistent content, via UEFI drivers and UEFI applications. The AL phase runs UEFI drivers used for storing the state of IHS 100 during the OS orderly shutdown, sleep, hibernate or restart processes.

Because PEI is executed before memory initialization, very limited memory resources are available during this phase. No global variables or procedures for de-allocating memory are available during PEI.

Pre-EFI Initialization modules ("PEIMs") are specialized drivers that are executed during PEI. PEIMs are generally utilized to perform the actual hardware initialization that takes place during PEI. Communication between PEIMs is very difficult during the limited memory PEI phase. To enable such communication, the PEI phase provides mechanisms for PEIMs to locate and invoke interfaces from other PEIMs. Such mechanism is referred to a PEIM-to-PEIM Interface (PPI). The PEI phase allows installing, reinstalling, and locating PPIs. The PEI phase also allows a PEIM to register to receive a notification when a specified PPI is installed. In most implementations, PEI maintains a PPI database for storing data identifying installed PPIs.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

In some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 109 may also implement operations for detecting certain changes to the physical configuration or posture of IHS 100 and managing the modes of a touchpad or other user input device 106 in different configurations of IHS 100. For instance, where IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc.

EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. In this manner, EC 109 may validate the integrity of hardware and software components installed on IHS 100.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be executed by components integrated into processor(s) 101 as systems-on-a-chip (SoC). As such, in various embodiments, IHS 100 may be implemented as different classes of computing devices including, but not limited to: servers, workstations, desktops, laptops, appliances, video game consoles, tablets, smartphones, etc.

Figure 2:
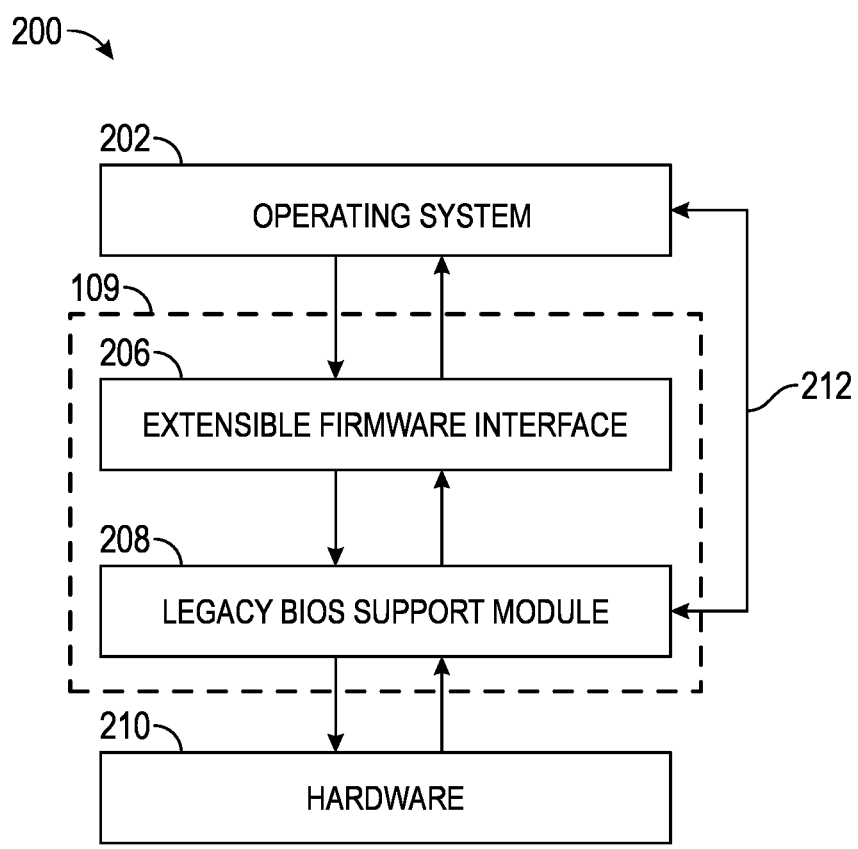
FIGS. 2 and 3 are diagrams of examples of aspects of Basic Input/Output (BIOS) or Extensible Firmware Interface (EFI) firmware, according to some embodiments.

Referring now to FIG. 2, examples of aspects of EFI environment 200 created by BIOS 109 of IHS 100 are described. As shown, BIOS 109 comprises firmware compatible with the UEFI Specification. The UEFI Specification describes an interface between OS 202 and BIOS 136. Particularly, the EFI Specification defines the interface that BIOS 109 implements and the interface that OS 202 may use in booting.

According to an implementation of EFI 200, both EFI 206 and legacy BIOS support module 208 may be present in BIOS 109. This allows IHS 100 to support both firmware interfaces. To provide this, interface 212 may be used by legacy OSs and applications.

The operation and architecture of EFI 200 is described in the UEFI Specification and in Framework, both available from INTEL CORPORATION. Additional details regarding the architecture and operation of the EFI 206 are provided below with respect to FIG. 3.

Figure 3:
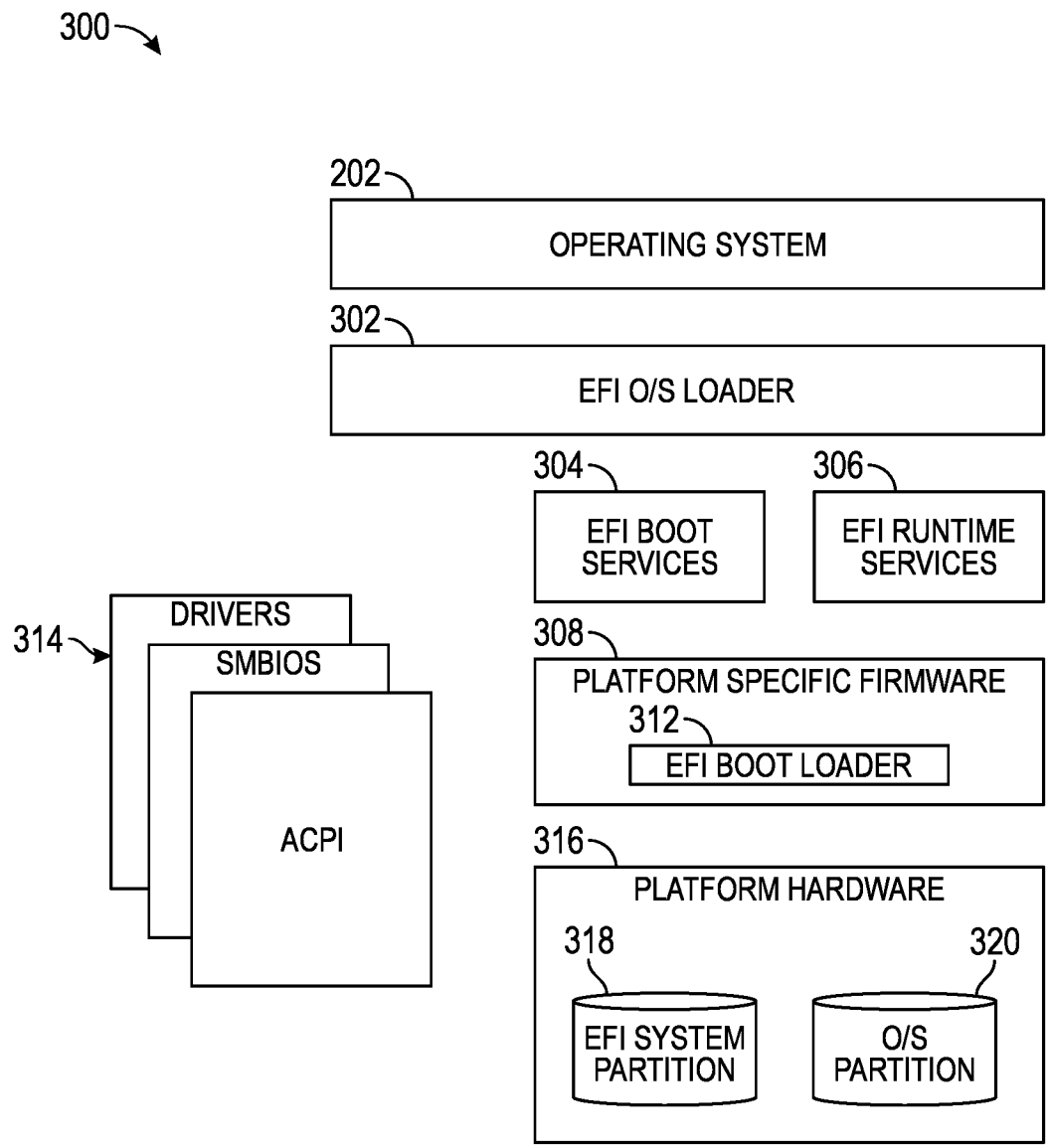

FIG. 3 provides additional details regarding EFI Specification-compliant system 300. As shown, system 300 includes platform hardware 316 and OS 202. Platform firmware 308 may retrieve an OS image from EFI system partition 318 using an EFI O/S loader 302. EFI system partition 318 may be an architecturally shareable system partition. As such, EFI system partition 318 defines a partition and file system that are designed to allow safe sharing of mass storage between multiple vendors. 0/S partition 320 may also be utilized.

Once started, EFI O/S loader 302 continues to boot the complete OS 202. EFI O/S loader 302 may use EFI boot services 304 and interface to other supported specifications to survey, comprehend, and initialize the various platform components and the operating system software that manages them. Thus, drivers 314 from other specifications may also be present on system 300. For example, the Advanced Configuration and Power Management Interface (ACPI) and the System Management BIOS (SMBIOS) specifications may be supported.

EFI boot services 304 provide interfaces for devices and functionality usable during boot time. EFI runtime services 306 may also be available to O/S loader 302 during the boot phase. For example, a minimal set of runtime services may be presented to ensure appropriate abstraction of base platform hardware resources that may be needed by OS 202 during its normal operation. EFI allows extension of platform firmware by loading EFI driver and EFI application images which, when loaded, have access to EFI-defined runtime and boot services.

Various program modules provide boot and runtime services. These program modules may be loaded by the EFI boot loader 312 at boot time. EFI boot loader 312 is a component in the platform specific firmware 308 that determines which program modules should be explicitly loaded and when. Once the platform specific firmware 308 is initialized, it passes control to boot loader 312. Boot loader 312 is then responsible for determining which of the program modules to load and in what order.

Figure 4:
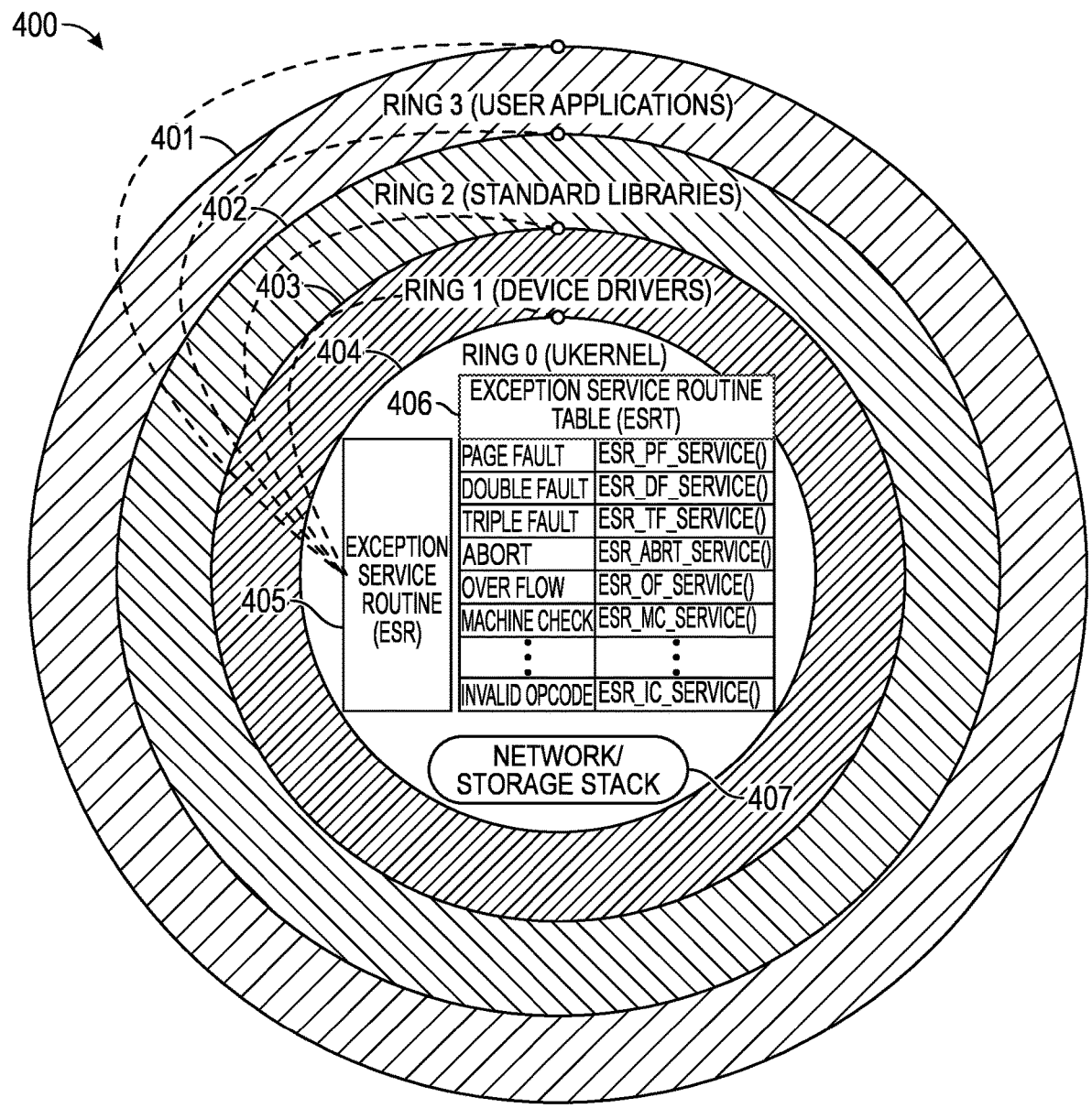
FIG. 4 is a diagram of an example of a ring architecture showing an Exception Service Routine (ESR) and an Exception Service Routine Table (ESRT) configured to enable the dynamic remediation of fatal errors, according to some embodiments.

FIG. 4 is a diagram of an example of ring architecture 400 showing ESR 405 and ESR Table (ESRT) 406 configured to enable the dynamic remediation of fatal errors in IHS 100. In ring architecture 400, OS 202 and the CPU 101 work together to restrict what a user level program can do. In this example, there are four privilege levels that start from ring 0 (most privileged) to ring 3 (least privileged). Ring 3 includes user applications 401 that run by making use of services provided by inner rings. Ring 2 includes standard libraries 402, ring 1 includes device drivers 403, and ring 0 includes micro kernel code 404, which closely interacts with IHS hardware.

CPU exceptions (i.e., anomalous or exceptional conditions requiring special processing) break the normal flow of execution and execute a pre-registered exception handler in erroneous situations such as, for example, when accessing an invalid memory address or when dividing by zero. To react to them, ESR 405 and ESRT 406 may be deployed in ring 0, along with micro kernel code 404, for performing CPU exception handling operations.

Figure 5A:
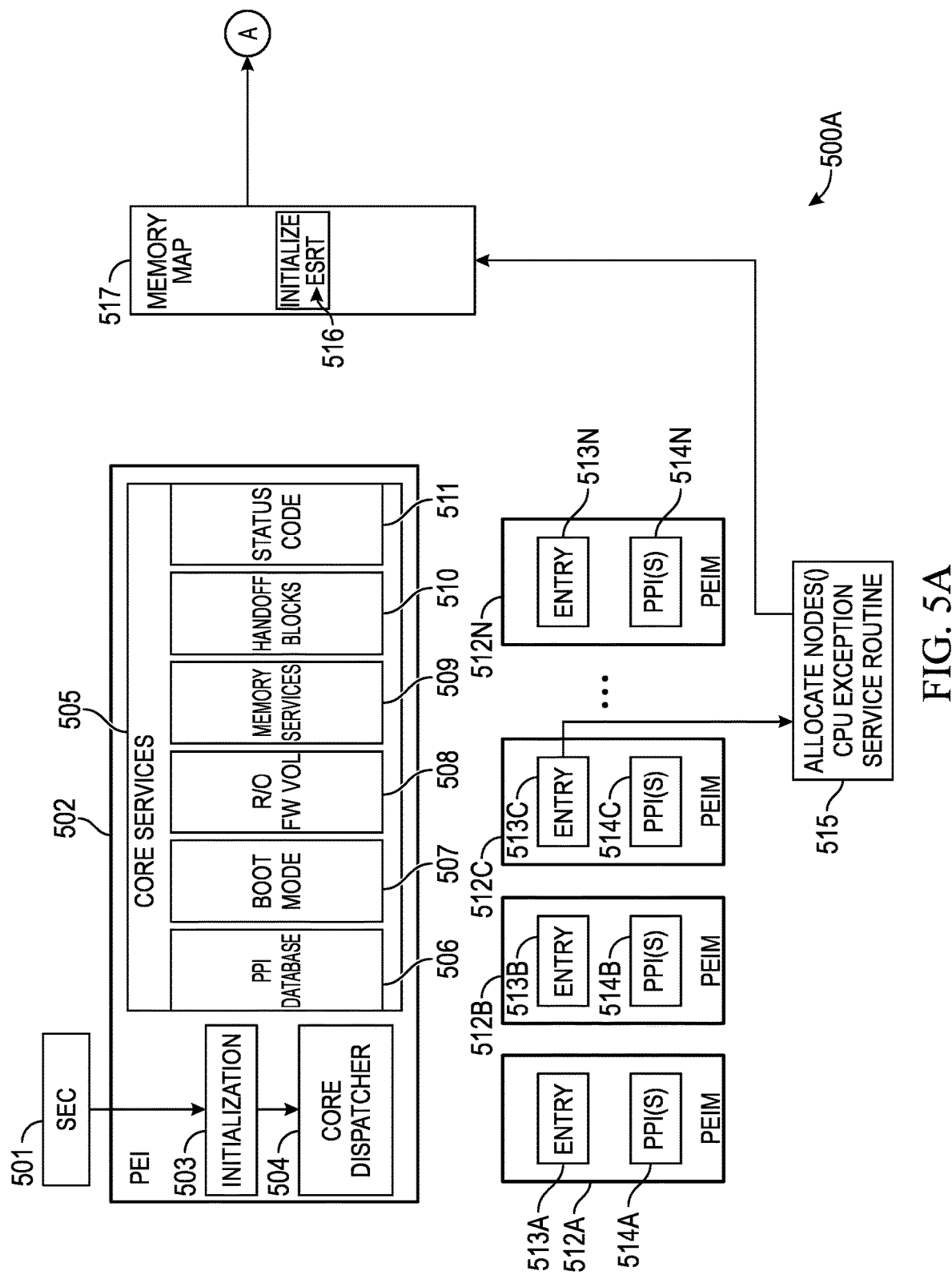
FIGS. 5A and 5B are diagrams of an example of a method for ESRT and Interrupt Service Routine Table (ISRT) linking, according to some embodiments.
Figure 5B:
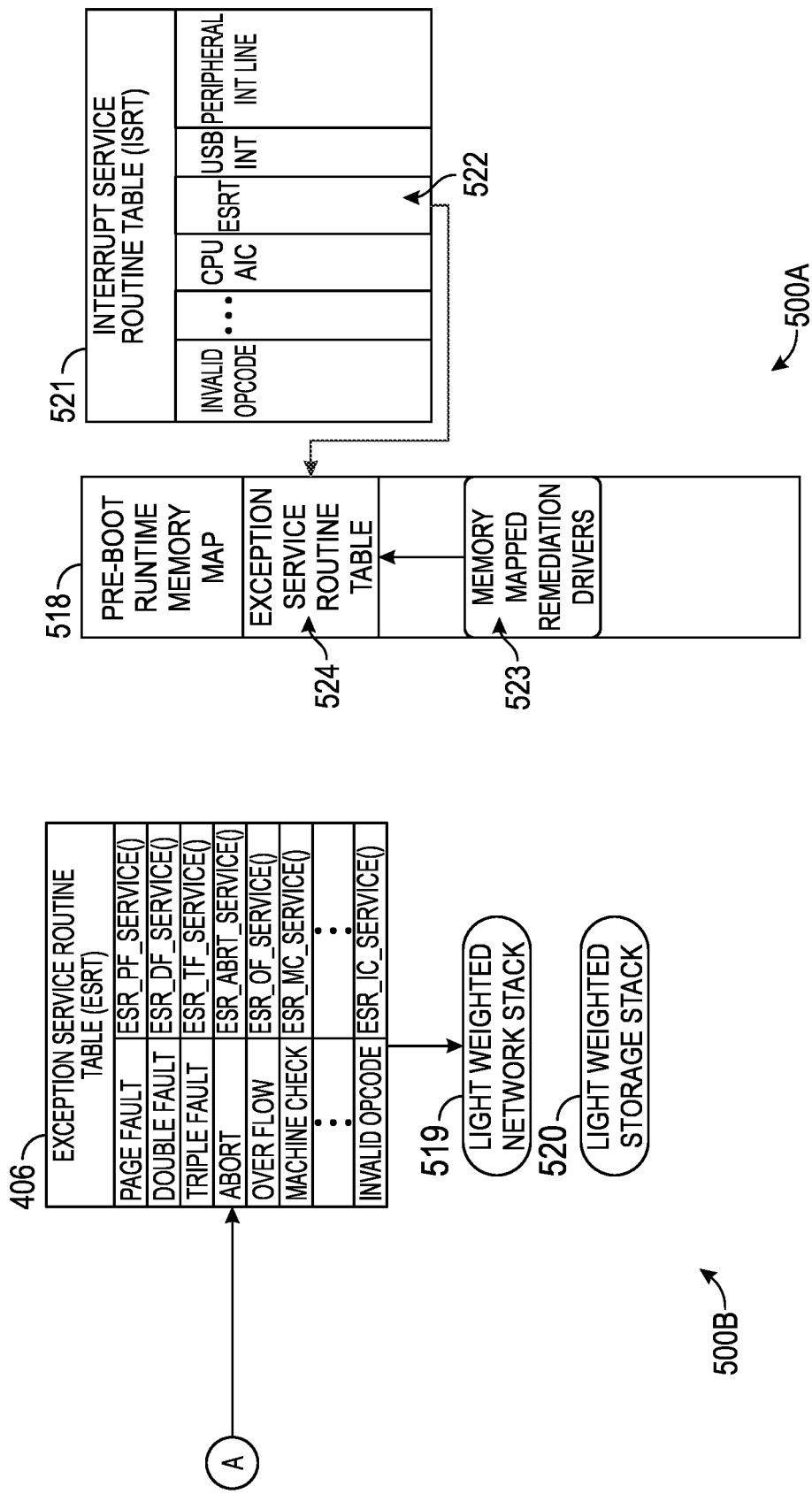

In some cases, ESRT 406 may be extended as an Interrupt Service Routine Table (ISRT), as shown in FIG. 5B below, which is dynamically updated during the BDS phase when exit boot services are called. This ensures OS or application-related exceptions are directly routed and calls a corresponding "esr_xxx" routine based on the exception type, which may include, but are not limited to: Page Faults, Double Faults, Triple Faults, Aborts, Overflows, Machine Checks, Invalid OpCodes, etc.

In various embodiments, ESR 405 may use ESRT 406 to dynamically reinitialize pre-boot network and/or storage stacks 407, and to locate and load context-specific remediation module(s) to ensure boot continuity of IHS 100. Based on ESRT 406, ESR routines 405 may be initialized for each CPU exception type.

Memory for creating ESRT 406 may be allocated in the PEI phase and all ESR vectors and table entries may be created and initialized during the DXE phase. Moreover, ESRT 406 may be remapped into the runtime memory map space for OS runtime failover exceptions.

For all boot exceptions, ESRT 406 may be readily available. For example, the Double Fault exception is an exception where an exception handler itself runs into another exception due to a page not found in memory. Because the ESRT 406 gets memory contents from the PEI phase, the memory and its mapping is available for handling any type of exception to guarantee that a failover path in pre-boot exception memory maps to a proper namespace.

FIGS. 5A and 5B are diagrams of an example of a method for ESRT 406 and ISRT 521 linking. Particularly, the method begins in FIG. 5A with SEC phase 501 and moves on to PEI phase 500A. PEI 502 includes Initialization 503 and core dispatcher 504. Core services 505 include PPI database 506, Boot Mode 507, R/O FW volume 508, Memory Services 509, Handoff Blocks 510, and Status Code 511. Core dispatcher 504 is coupled to a plurality of PEIMs 512A-N, each having a respective entry 511A-N and PPI(s) 514A-N.

One or more entries 513A-N in PEIMs 512A-N(e.g., 513C in PEIM 512C) may AllocateNodes( ) 515 for ESR 405, which at 516 initializes ESRT 406 in memory map 517 and loads service routines. In the DXE phase that follows at 500B in FIG. 5B, ESR 405 is configured to initialize or load a respective network stack 519 and/or storage stack 520 mapped to exception types using ESRT 406 depending on context.

In the subsequent RT phase 500C, ESRT entry 522 of ISRT 521 and memory mapped remediation drivers 523 are dynamically linked or otherwise point to ESRT 524 within pre-boot runtime memory map 518. ESRT 524 may then be translated and/or remapped into OS runtime memory after exiting boot services for all runtime failover exception handling.

Figure 6:
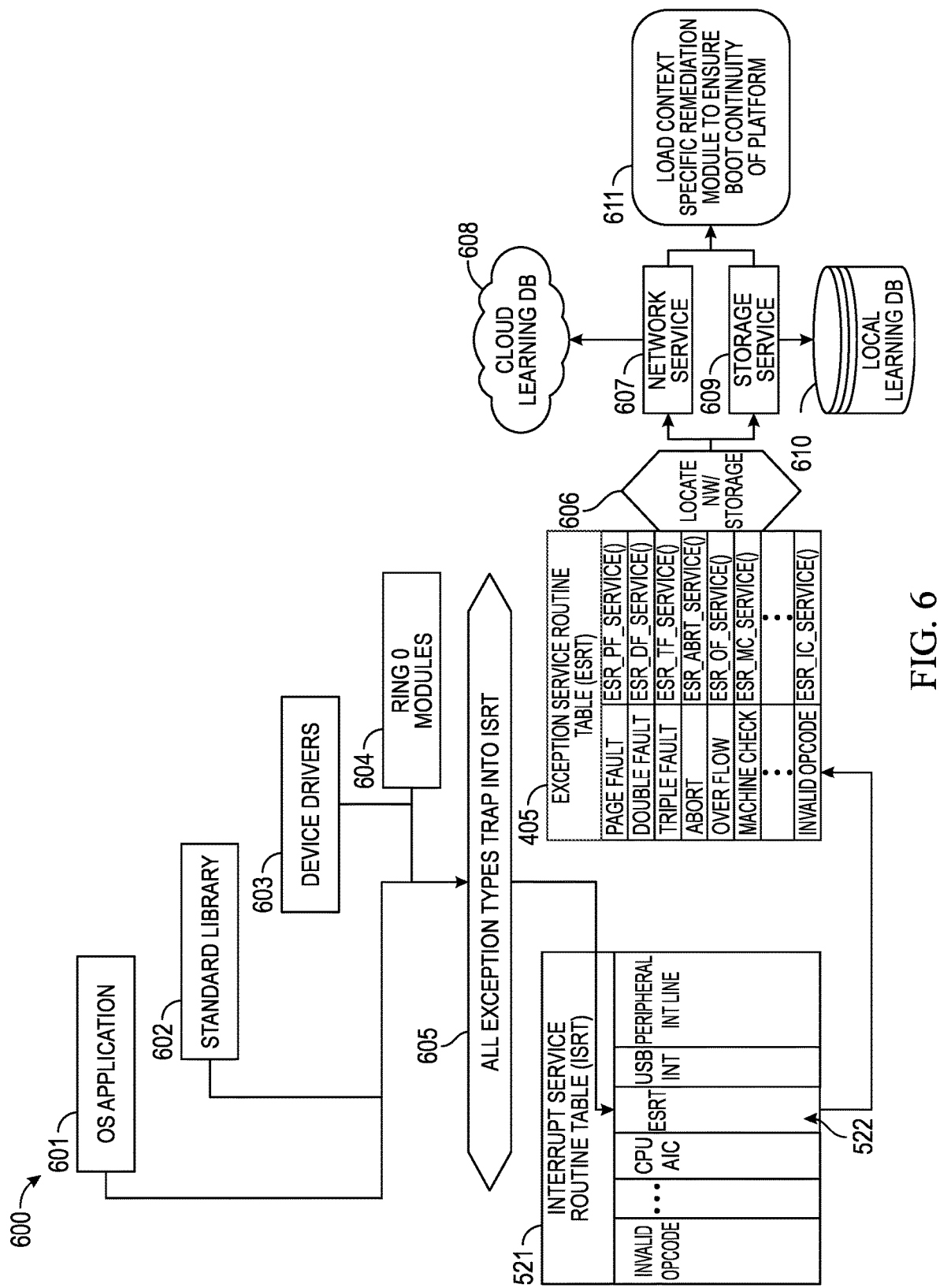
FIG. 6 is a diagram of an example of a method for dynamic remediation of fatal errors, according to some embodiments.

FIG. 6 is a diagram of an example of method 600 for dynamic remediation of fatal errors. At 605, all exception types from OS application 601, standard library 602, device drivers 603, and ring 0 modules 604 trap into ISRT 521. ESR 405 services may be registered by OS 202 to ensure that all failover mechanisms are enabled and operative.

Upon ESR 405's detection of a CPU exception, ESRT 522 entry of ISRT 521 maps into ESRT 406, thus invoking a corresponding exception handling routine ("esr_xxx"), which in turn locates network and storage services at 606. Network service 607 is coupled to cloud learning service or database 608, and storage service 609 is coupled to local learning service or database 610. Then, at 611 method 600 loads context-specific remediation module(s) to ensure boot continuity.

As a result, all exceptions are trapped into ESRT 406, which maps the corresponding exception type and calls the appropriate exception routine. Based on the exception type and OS runtime context, network/storage services 607/608 are dynamically loaded, which connect over a local or cloud learning service or database 608/610 to learn failure behavior and build defensible self-healing protocols to provide better user experience by continuing the IHS's boot process.

Figure 7:
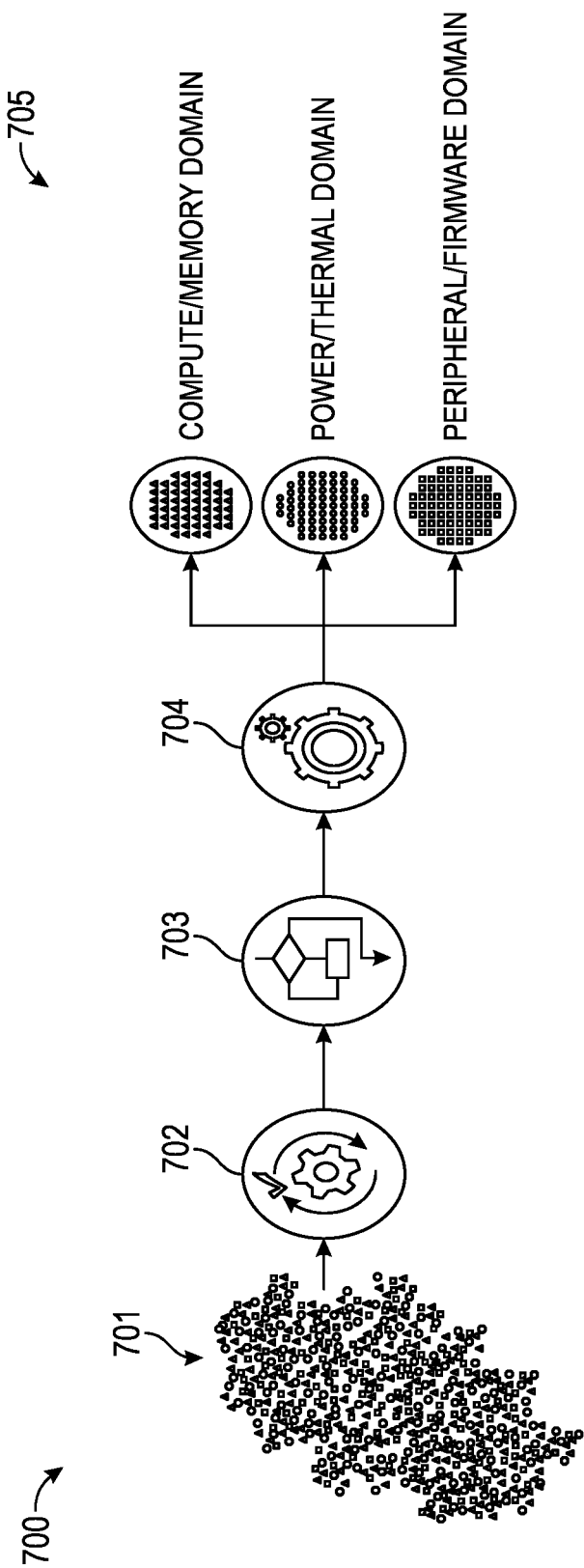
FIG. 7 is a diagram of an example of a method for providing error remediation or auto-healing modules for uninterrupted boot and runtime operations, according to some embodiments.

FIG. 7 is a diagram of an example of method 700 for providing error remediation or auto-healing modules for uninterrupted boot and runtime operations. In some embodiments, method 700 may be performed, at least in part, by a cloud connected learning module (e.g., 608) executed by a remote IHS in communication with IHS 100 over a network (e.g., the Internet). In other embodiments, method 700 may be locally performed at least in part by IHS 100 (e.g., 610).

In operation, method 700 may implement unsupervised learning techniques. For example, a cloud connected learning module may be stitched with ESR 405 such that, based upon a current exception type, learned behaviors and solutions are mapped to analyze the resolution pass percentage and simulated results. A selected remediation action may be applied by reinitializing the already memory-mapped remediation drivers at OS runtime, and boot continuation may be achieved without a reboot or shutdown of IHS 100.

Particularly, method 700 begins at 701, where raw failure data is received (e.g., CPU attributes, memory and storage attributes, firmware data store attributes, DXE/PEI module attributes, OS/VM attributes, power and thermal attributes, Advanced Configuration and Power Interface (ACPI) attributes, peripherals' attributes, etc.). At 702, method 700 may process or interpret the raw data.

At 703, method 700 may apply a Machine Learning (ML) or Artificial Intelligence (AI) algorithm to identify a domain for which to retrieve a remediation or self-healing module, which may consider failures from other IHSs or LOBs. After additional processing operations at 704, output 705 of method 700 may classify failures into different remediation domains (e.g., compute/memory, power/thermal, peripheral/firmware, etc.). Depending upon the failure or type of failure, a remediation or self-healing module may be selected by the cloud or local service from a respective domain.

As such, systems and methods described herein allow an IHS to dynamically perform self-healing, and to continue its boot and/or runtime operations. A dynamic learning method learns the IHS's behavior history and builds defensible actions to self-heal the IHS and recover it, and to enable booting the OS/BIOS, which reduces downtime. A cloud service may be implemented to provide critical data export/import to/from the cloud, and to enable uninterrupted resumption with remediation modules. With runtime memory map of remediation drivers, an exception handler as described herein facilitates boot continuity or continued OS operations in a normal manner without the need for IHS reboot, reset, or shutdown.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation (s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
   a Central Processing Unit (CPU); and
   a memory coupled to the CPU, the memory having program instructions stored thereon that, upon execution, cause the IHS to:
      allocate memory space for a CPU Exception Service Routine (ESR) in a pre-Extensible Firmware Interface (EFI) initialization (PEI) phase;
      in response to an error, call the CPU ESR; and
      at least one of:
         re-initialize a pre-boot network stack and transmit error data to a remote service using the pre-boot network stack; or
         re-initialize a pre-boot storage stack and store the error data using the pre-boot storage stack.

2. The IHS of claim 1, wherein the error comprises a Blue Screen of Death (BSoD) or stop error.

3. The IHS of claim 1, wherein the error comprises a Power-On Self-Test (POST) error.

4. The IHS of claim 1, wherein the error comprises at least one of: page fault, double fault, triple fault, abort, overflow, invalid opcode, general protection fault, or machine check.

5. The IHS of claim 1, wherein the program instructions, upon execution, further cause the IHS to use the ESR to load an error remediation module.

6. The IHS of claim 1, wherein the program instructions, upon execution, further cause the IHS to implement a runtime memory map of pre-boot drivers.

7. The IHS of claim 1, wherein the program instructions, upon execution, further cause the IHS to continue an IHS boot from a point of failure corresponding to the error.

8. The IHS of claim 1, wherein the program instructions, upon execution, further cause the IHS to remap an ESR table (ESRT) into a runtime memory space as an Interrupt Service Routine Table (ISRT).

9. The IHS of claim 8, wherein the remapped ESRT is configured to handle an Operating System (OS) runtime failover exception.

10. The IHS of claim 1, wherein the program instructions, upon execution, further cause the IHS to receive an auto-healing module from the remote service based, at least in part, upon the error data.

11. The IHS of claim 10, wherein the auto-healing module is configured to allow the IHS to continue a current boot without any reboot or shutdown.

12. The IHS of claim 11, wherein the auto-healing module is selected among other auto-healing modules classified as belonging to at least one of: a compute or memory domain, a power or thermal domain, or a peripheral or firmware domain.

13. The IHS of claim 12, wherein the auto-healing module is selected based upon another error in another IHS.

14. In an Information Handling System (IHS), a method comprising:
   in response to a fatal error, calling a Central Processing Unit (CPU) Exception Service Routine (ESR);
   remapping an ESR table (ESRT) into a runtime memory space as an Interrupt Service Routine Table (ISRT); and
   re-initializing a pre-boot network stack and transmitting error data to a remote service using the pre-boot network stack.

15. The method of claim 14, further comprising using the ESR to load an error remediation module.

16. The method of claim 15, further comprising booting the IHS from a point of failure corresponding to the error.

17. The method of claim 14, wherein the remapped ESRT is configured to handle an Operating System (OS) runtime failover exception.

18. A non-transitory memory storage device having program instructions stored thereon that, upon execution by an Information Handling System (IHS), cause the IHS to:
   in response to a fatal error, call a Central Processing Unit (CPU) Exception Service Routine (ESR);
   remap an ESR table (ESRT) into a runtime memory space as an Interrupt Service Routine Table (ISRT), wherein the ISRT is configured to handle an Operating System (OS) runtime failover exception; and
   re-initialize a pre-boot storage stack and store error data in the IHS using the pre-boot storage stack.

19. The non-transitory memory storage device of claim 18, wherein the program instructions, upon execution, further cause the IHS to use the ESR to load an error remediation module.

20. The non-transitory memory storage device of claim 19, wherein the error remediation module is configured to allow the IHS to continue a current boot without any reboot or shutdown.

* * * * *